(12) United States Patent
Lawrence

(10) Patent No.: US 6,826,196 B1
(45) Date of Patent: *Nov. 30, 2004

(54) METHOD AND APPARATUS TO ALLOW CONNECTION ESTABLISHMENT OVER DIVERSE LINK TYPES

(75) Inventor: Jeremy R. Lawrence, Newtown (AU)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/295,210

(22) Filed: Apr. 21, 1999

(51) Int. Cl.[7] ............................................. H04L 12/28
(52) U.S. Cl. ................................... 370/466; 370/395.5
(58) Field of Search ................................ 370/379, 399, 370/409, 351, 389, 395.1, 395.3, 395.5, 464, 465, 469, 474, 466; 709/238, 239, 240

(56) References Cited

U.S. PATENT DOCUMENTS

| | | | | |
|---|---|---|---|---|
| 5,737,334 A | * | 4/1998 | Prince et al. | 370/395.53 |
| 5,790,522 A | * | 8/1998 | Fichou et al. | 370/236 |
| 5,920,705 A | * | 7/1999 | Lyon et al. | 370/409 |
| 6,466,577 B1 | * | 10/2002 | Humblet et al. | 370/395.3 |

OTHER PUBLICATIONS

Faucheur, Francois. "IETF Multiprotocol Label Switching (MPLS) Architecture". IEEE International Conference. Jun 22, 1998–Jun. 6, 24, 1998. pp. 6–15.*
MPLS Working Group. "MPLS Architecture". Aug. 10, 1997. Slides 1–30.*
Stallings, William. Data And Computer Communications. 5th Edition, copyright 1997. pp. 510–520.*
Ryan, Jerry. Multiprotocol Label Switching (MPLS). The Technology Guide Series. Copyright 1998.*
White Paper. Scaling the Internet with Tag Switching. Cisco Systems, Inc. Copyright 1996.*
Rosen, Eric, et al., "Multiprotocol Label Switching Architecture," Internet Draft, draft–ieft–mpls–arch–02.txt, Jul. 1998.
Davie, Bruce, et al., "Use of Label Switching with ATM," Internet Draft, draft–davie–mpls–atm–01.,txt, Jul. 1998.
Nagami, Ken–Ichi, et al., "VCID Notification over ATM Link," Internet Draft, draft–ietf–mple–vcid–atm–01.txt, Aug. 1998.
Suzuki, Muneyoshi, "The Assignment of the Information Field and Protocol Identifier in the Q.2941 Generic Identifier and Q.2957 User–touser Signaling for the Internet Protocol, Internet Draft", draft–ietf–mpls–git–uus–00.txt, Jun. 29, 1998.
Rekhter, Yakov & Eric Rosen, "Use of Lable Switching With RSVP", "Internet Draft", draft–ietf–mpls–rsvp–00.txt, Sep. 1998.
Rekhter, Yakov & Eric Rosen, "Carrying Lable Information in BGP–4," Internet Draft, draft–ietf–mpls–bgp4–mpls–00.txt, Oct. 1998.
Feldman, Nancy, et al., "LDP Specification," Internet Draft, draft–feldman–Idp–spec–00.txt, Nov. 1997.
Davie, Bruce, et al., "Use of Lable Switching with RSVP", Internet Draft, Draft–ietf.mpls–rsvp–00.txt, Mar. 1998.

* cited by examiner

Primary Examiner—Chi Pham
Assistant Examiner—Derrick W Ferris
(74) Attorney, Agent, or Firm—Blakely, Sokoloff, Taylor & Zafman LLP

(57) ABSTRACT

A data switching system is described to allow arbitrary types of connections to be established over arbitrary link types that include link types that do not inherently support virtual circuits. The data switching system includes a label switching system to establish virtual circuit connections over any link types. The data switching system also includes a connection routing and signaling controller, coupled to the label switching system to determine routes for connection over any link types.

53 Claims, 10 Drawing Sheets

US 6,826,196 B1

METHOD AND APPARATUS TO ALLOW CONNECTION ESTABLISHMENT OVER DIVERSE LINK TYPES

I. FIELD OF THE INVENTION

The present invention relates generally to network switching. More particularly the present invention relates to connection establishment over data links.

II. BACKGROUND OF THE INVENTION

Multiservice network switches such as the BPX™8650 sold by Cisco Systems, Inc. of San Jose, Calif., may be used to provide a data path, or interface, between multiple sub-networks. Multiple sub-networks may operate according to different data link standard protocols. Examples of data link standard protocols supported by multiservice switches include, but are not limited to frame relay, voice, circuit emulation, T1 channelized, T3 channelized, and Asynchronous Transfer Mode (ATM).

FIG. 1 is a block diagram illustrating a prior art network 100 of switches. Connection routing control processes on the switches communicate with each other and set up connections through the switches. Network 100 includes a number of switches 102–108 that are coupled therebetween by way of port cards 132–146 and trunks 148–154. Network 100 also includes customer premises equipment (CPE) units 160 and 162 coupled to switches 106 and 108 by way of links 156 and 158 and port cards 143 and 147, respectively. Switches 102108 include control cards 112–118. The control cards include connection routing processors 122–128, respectively. Each connection routing processor determines a route through a network. Connection routing processors 122–128 communicate therebetween by way of a connection routing protocol. The connection routing processors set up end-to-end connections, building connections out of virtual circuits on trunks 148–154 and cross-connects on switches 102–108. A command line interface is used to input a request for an end-to-end connection in one switch. Such end-to-end connection, for example, connects one virtual circuit on a port 147 connected to CPE 162 to another virtual circuit on a port 143 connected to the other CPE 160. In this way, end-to-end virtual connections allow different CPEs to communicate across the network of switches.

FIG. 2 shows a prior art switch 200 that may be a node of a network. Switch 200 generally comprises a data path 225 and a command bus 227 to which a controller 205, and port cards 210, 215, 220 may be coupled. Port cards 210, 215 connect switch 200 to other switches or nodes of the network. Port card 220 is coupled to CPE A. The port cards may be configured in a number of different ways to allow communication between trunks and CPE via data path 225.

Controller 205 generally performs control functions for a single switch 200 using command bus 227. Controller 205 includes a connection routing protocol 207, a switch resource management software 208, and a configuration database 206. The configuration database 206 includes information regarding the configuration and capabilities of the port cards. Controller 205 also provides a user interface 235 that allows a user access to and control of switch 200. The user interface 235 is also used to configure switch 200 and connection routing protocol 207. Switch resource management 208 establishes and de-establishes switch connections under the control of the connection routing protocol 207.

Controller 205 treats switch 200 as a single network node, addressing all communications destined for switch 200 to a network address of switch 200. Controller 205 receives and processes connection routing protocol messages and determines which local resources are affected by the protocol message. If the protocol message affects a resource not present on controller 205, controller 205 translates the configuration information originally contained in the protocol message to a format suitable for use by a target port card. Controller 205 then transfers the translated configuration information to the target port card via command bus 227. A port card is a card interfacing to a link that is coupled to another link or CPE or another communication device. The port card receives and processes the configuration information. The port cards indicate to controller 205, using command bus 227, completion of the configuration operations. A major disadvantage of this switch and controller arrangement is that the single controller is limited to supporting a single network connection routing protocol. This limits the control of all of the resources of the switch to the single configuration supported by the connection routing protocol.

Typically, virtual circuit connections are supported by links that inherently support virtual circuits, such as ATM, frame relay, and x.25 links. Connection routing systems, such as Cisco's AutoRoute™ and the ATM forum's private network-to-network interface (PNNI), are used only on these types of links or a subset thereof. PNNI is a common standard for ATM and frame relay networks that inherently support virtual circuits. One disadvantage is that in the prior art, the combination of a connection routing system and a virtual circuit switch does not allow sending packets of data on every link type. For example, no existing switch allows the forwarding of packets on virtual circuits, set up by a PNNI controller, from ATM links that support virtual circuits to Ethernet links that do not inherently support virtual circuits.

SUMMARY OF THE INVENTION

A data switching system is described to allow arbitrary types of connections to be established over arbitrary link types that include link types that do not inherently support virtual circuits. The data switching system includes a label switching system to establish virtual circuit connections over any link types. The data switching system also includes a connection routing and signaling controller, coupled to the label switching system, to determine routes for connections over any link types.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

An embodiment of the present invention is described relating to the establishment of virtual circuit connections over data links that may or may not inherently support virtual circuits. For one embodiment of the present invention, a switch includes an arrangement of a label switching system (LSS) and one (or more) connection routing and signaling controller(s) (connection controllers). For one embodiment, the LSS may include a data-forwarding engine and a label encapsulation unit. A connection control interface provides an interface between the connection controller and the label switching system. The switch allows arbitrary types of connections to be established over arbitrary link types. The arbitrary link types include link types that do not inherently support virtual circuits. By way of one embodiment of the present invention, one may establish PNNI routing over Ethernet links, for example.

Figure 1:
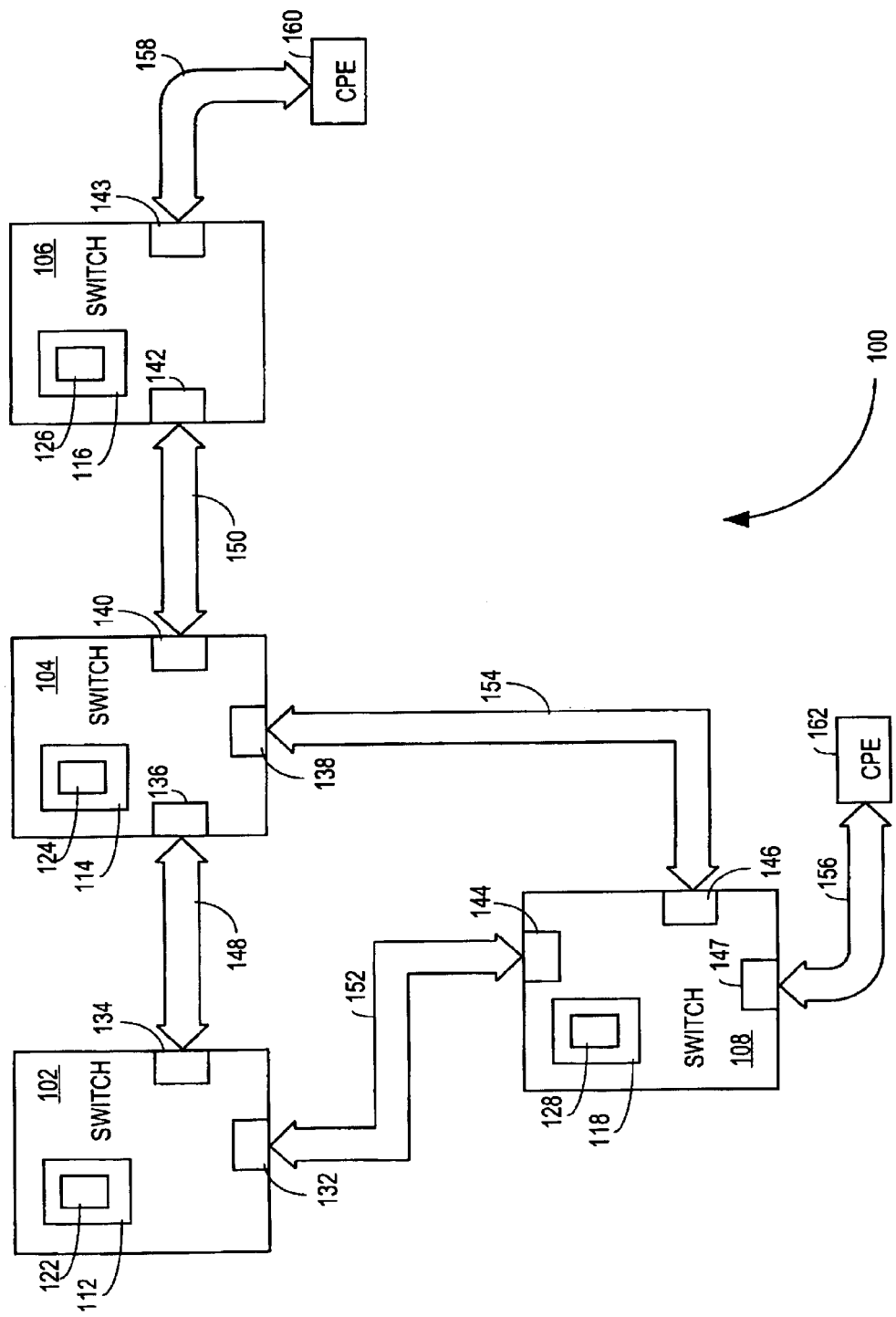
FIG. 1 illustrates a prior art network of switches.
Figure 2:
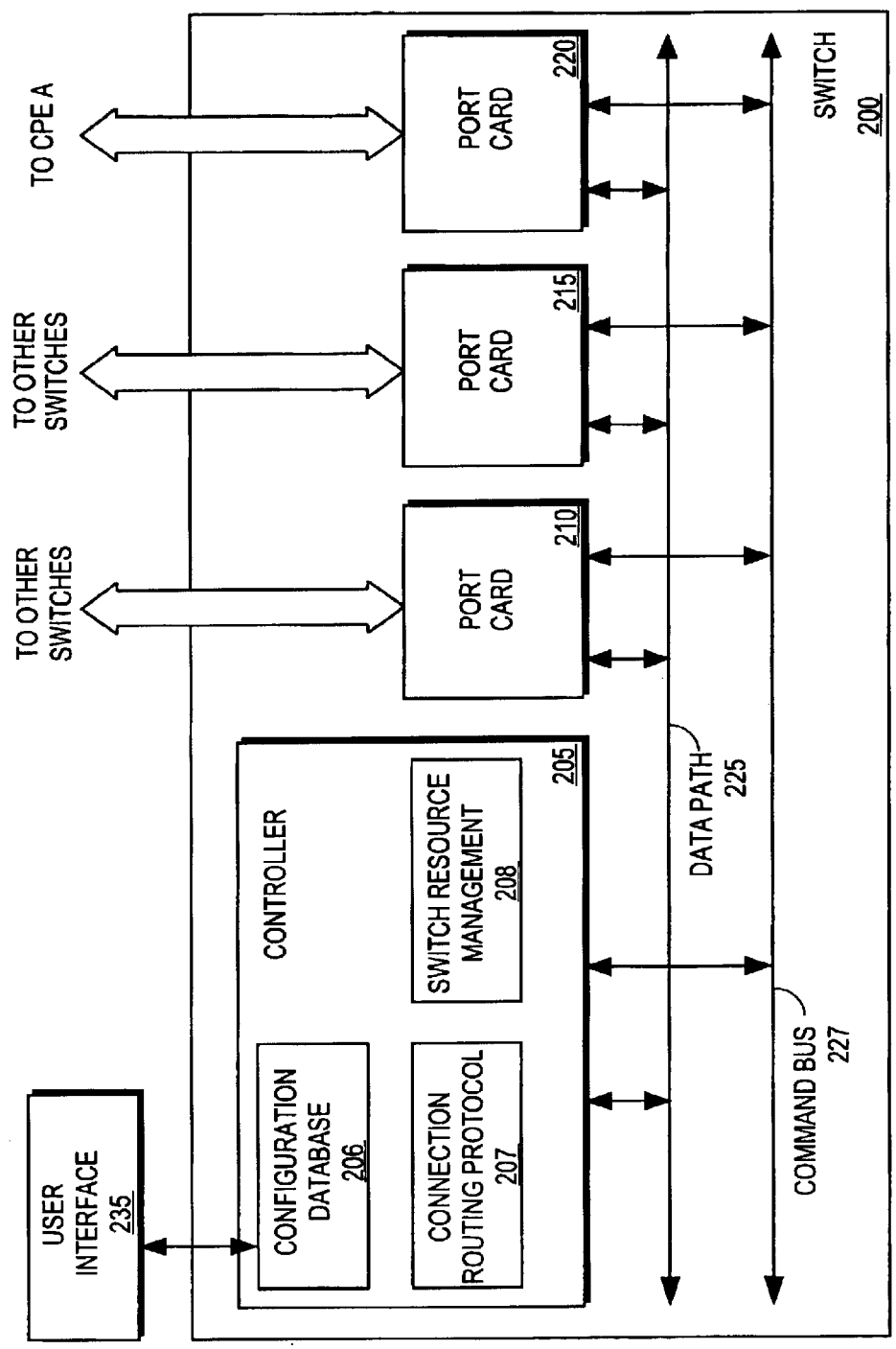
FIG. 2 illustrates a prior art switch node.
Figure 3A:
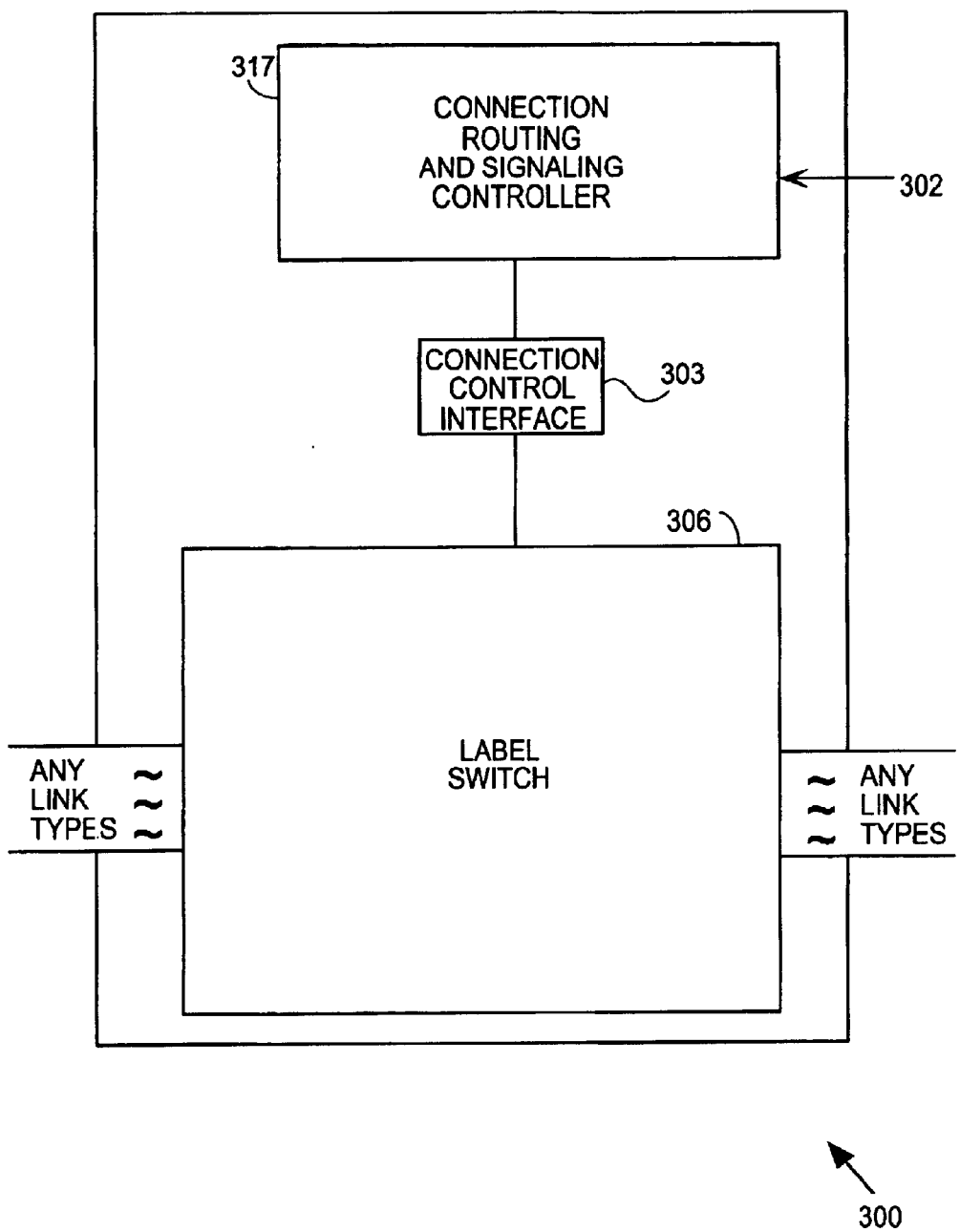
FIG. 3A is a block diagram representation of a switch including a label switch system and a connection routing and signaling controller.

FIG. 3A is a block diagram of an embodiment of a data switching system (hereinafter referred to as "switch") 300. Switch 300 includes a connection routing and signaling controller 317 (hereinafter referred to as "connection controller") and a label switching system (LSS) 306 coupled to the connection controller 317 via a connection control interface 303 that allows programming of connections. The connection controller 317 has a connection routing software running thereon. The connection routing software runs a connection routing protocol from connection controller 317 to connection controllers of other switches.

The connection control interface 303 is an interface by which different connection controllers control the switch. The LSS 306 supports the connection of virtual circuits between any link types. The combination of LSS 306 and connection control interface 303 permits different routing of connections by any types of connection controllers over any link types.

Typically, connection information is extracted from the connection routing software that runs on the connection controller 317. Connection controller 317 performs signaling that allows it to develop a map of the network and to maintain a topology database. Based on the topology database and in general another information, connection controller 317 determines a need for connections and specific routes through the network. Connection controller 317 also extracts cross-connect information to set up connections at the switch. This information is provided to LSS 306 that makes cross-connections from particular ports on particular labels to other particular ports on other particular labels.

Figure 3B:
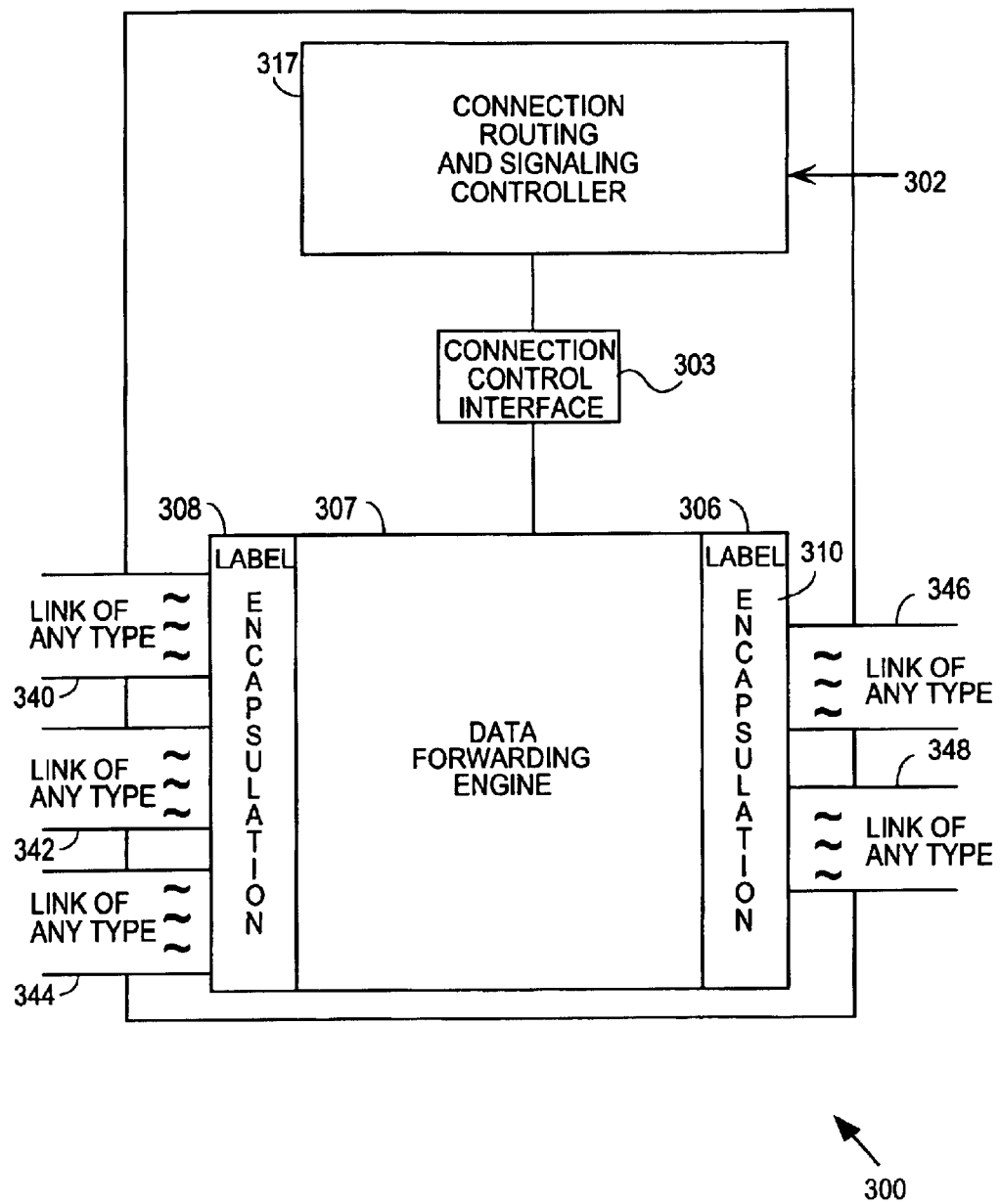
FIG. 3B illustrates the switch of FIG. 3A for one embodiment.

FIG. 3B shows one embodiment of the LSS 306 including a data-forwarding engine 307 and label encapsulation units 308, 310. The label encapsulation units 308, 310 form an interface between links of any types 340–348 and data forwarding engine 307. Data forwarding engine 307 supports a specific type of circuit or label switching. For one embodiment, data forwarding engine 307 supports ATM virtual path identifier/virtual channel identifier (VPI/VCI) switching. Label encapsulation allows circuits or virtual circuits to be carried over links of any type. Two label encapsulation units 308, 310 perform adaptation between label encapsulation on links 340–348 and the form of circuit or label switching used by data forwarding engine 307.

For one embodiment, label encapsulation unit 308 converts label encapsulation to ATM VPI/VCI encapsulation for packets incoming from a link 340. Such packets may be switched by the data forwarding engine 307 using ATM VPI/VCI switching. The conversion performed by label encapsulation unit 308 entails, among other things, segmenting the packet into ATM cells, so the packet may be switched using ATM VPI/VCI switching. A packet is generally switched towards a different link such as link 346. The label encapsulation unit 310 then converts the packet from ATM VPI/VCI encapsulation to label encapsulation. For this case, the conversion performed by label encapsulation unit 310 entails, among other things, reassembling the ATM cells into packets.

For one embodiment, the label encapsulation units 308, 310 may be "Multi-Protocol Label Switching" (MPLS) encapsulation units. The MPLS label encapsulation applies to links of any type. MPLS utilizes a set of procedures for providing network layer packets with "label stacks" thereby turning the packets into "labeled packets". When a packet is forwarded to its next hop, a label is sent along with the packet, i.e., the packet is "labeled." A "labeled packet" is a packet on which a label has been attached. At subsequent hops, the label is used as an index to a table which specifies the next hop and the new label. The old label is then replaced with a new label, and the packet is forwarded to its next hop. The process of using labels from incoming packets to determine next-hop links and outgoing labels is known as label switching.

Figure 4:
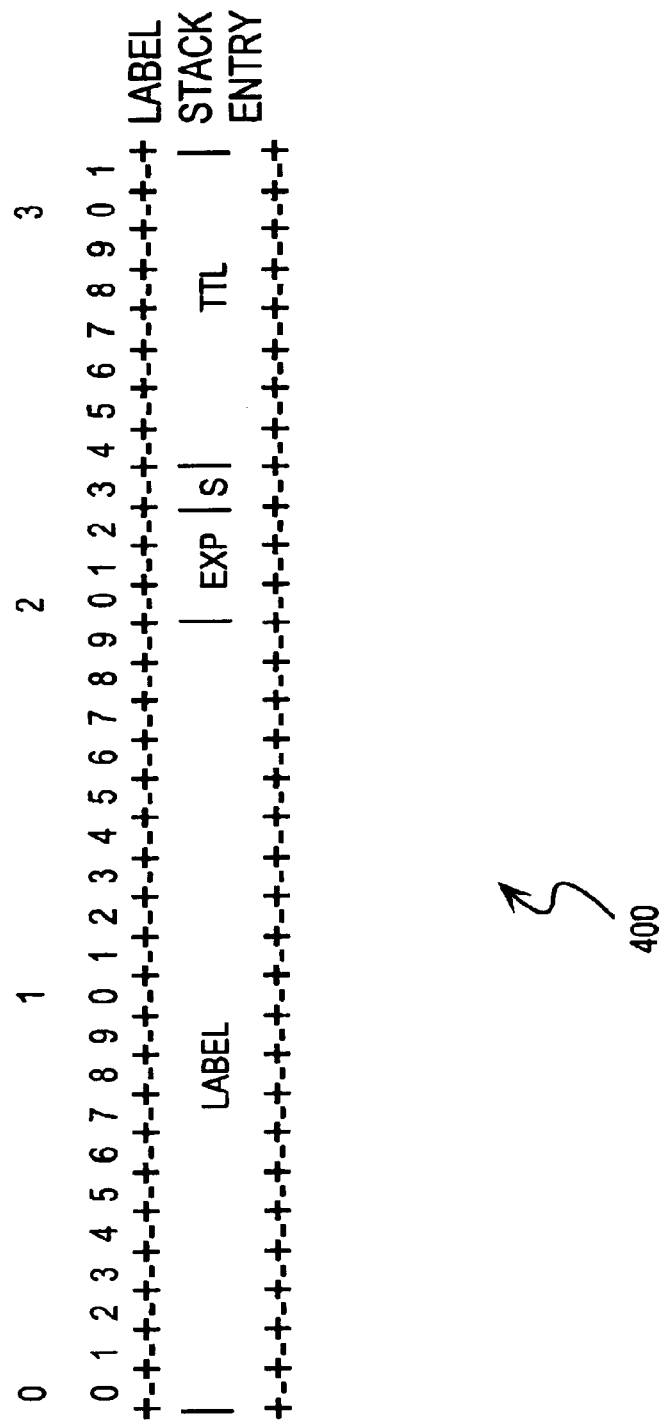
FIG. 4 illustrates a label stack entry in connection with the data switching systems according to one embodiment of the present invention.

The label stack is represented as a sequence of "label stack entries". Each label stack entry is represented by 4 octets. FIG. 4 illustrates a label stack entry 400. Label stack entries appear after data link layer headers, but before any network layer headers. Each label stack entry may be broken down into the following fields: (1) Bottom of Stack (S); (2). Time to Live (TTL); and (3) Experimental Use. The Bottom of the Stack bit is set to "1" for the last entry in the label stack (i.e., for the bottom of the stack), and zero for all other label stack entries. The Time to Live (TTL) is an eight-bit field used to encode a time-to-live value. The Experimental Use field is a three-bit field reserved for experimental use, such as carrying class of service information. The 20-bit field shown in the label stack entry 400 carries the actual value of a label. A top of the label stack appears earliest in the packet, while the bottom appears latest. The network layer packet immediately follows the label stack entry which has the S bit set.

To transmit a labeled packet on a particular data link, a data switching system 300 supports an encapsulation technique which, given a label value or a stack of label values and a network layer packet, produces a labeled packet. When a labeled packet is received, the label value at the top of the stack is looked up. As a result of a successful lookup one learns: (1) the next hop to which the packet is to be forwarded; and (2) the operation to be performed on the label stack before forwarding. This operation may be to replace the top label stack entry with another, or to pop an entry off the label stack, or to replace the top label stack entry and then to push one or more additional entries on the label stack. In addition to learning the next hop and the label stack operation, one may also learn the outgoing data link encapsulation, and possibly other information needed to properly forward the packet.

The LSS 306 may also simultaneously use different label encapsulations specific to a particular link type. For example, LSS 306 may use MPLS encapsulation over Ethernet and PPP-over-SONET links, but use ATM encapsulation over ATM links.

Figure 5:
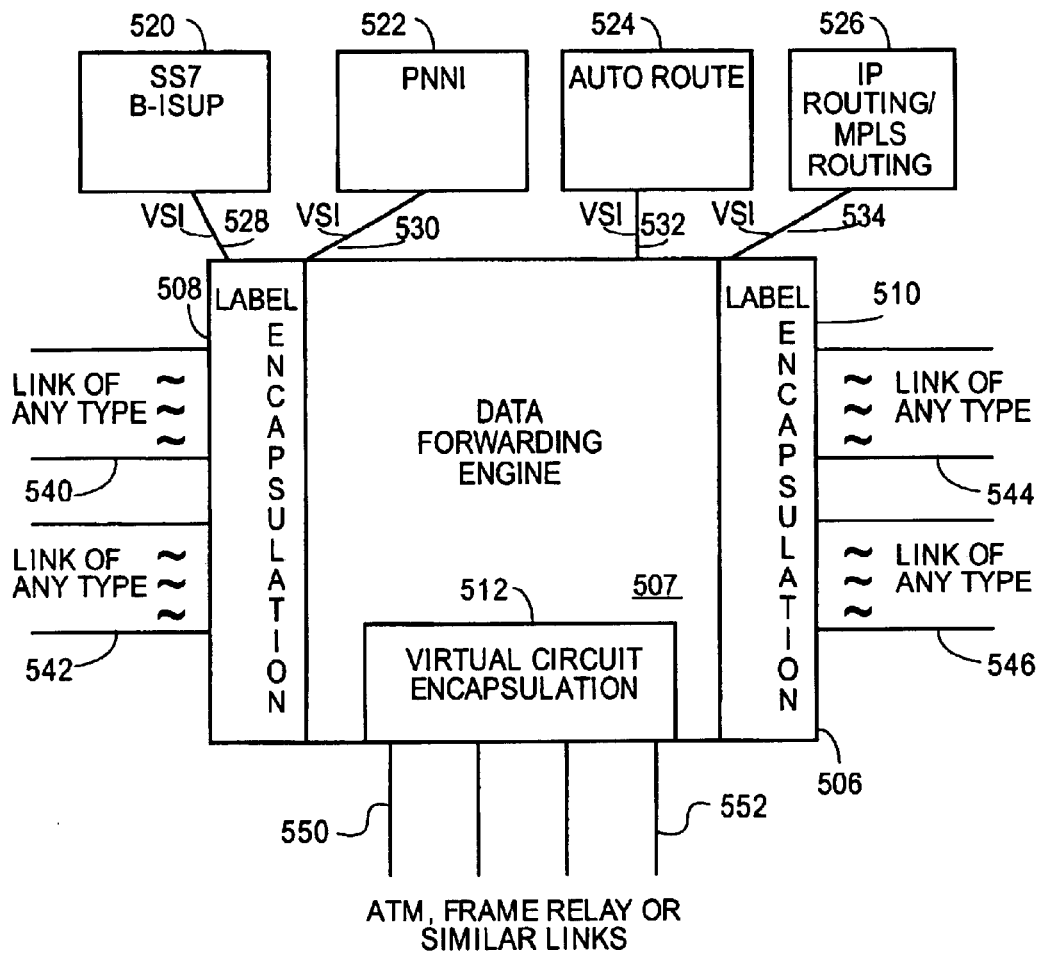
FIG. 5 is a block diagram illustrating several connection routing systems and a label switching system according to one embodiment of the invention.

FIG. 5 is a block diagram that illustrates several connection controllers 520, 522, 524, 526 coupled to a label switching system (LSS) 506. LSS 506 includes a data-forwarding engine 507 and one or more label encapsulation units 508, 510, and zero or more virtual circuit encapsulation units 512 such as on ATM encapsulation units. A virtual circuit encapsulation unit is a particular type of label encapsulation unit that may be used in connection with links that support virtual circuits. For one embodiment, LSS 506 may be a Multiprotocol Label Switching (MPLS) system. MPLS 506 includes data-forwarding engine 507, MPLS encapsulation units 508, 510, and ATM encapsulation unit 512. Several connection controllers such as B-ISUP 520, PNNI 522, AutoRoute™ 524, and Internet Protocol (IP) routing/MPLS routing 526 are coupled to data-forwarding engine 507. Other connection controllers including automatic routing controllers, tag switch controllers implementing tag distribution protocol and signaling system number 7 (SS7) controllers may be coupled to LSS 506. The connection controllers are coupled to LSS 506 via virtual switch interfaces (VSIs) 528, 530, 532 and 534, respectively.

VSI is a generic switch interface that allows programming of virtual circuits. VSI separates the function of connection routing from the function of establishing connections. This separation results in a data switching system with a connection controller that does not "see" what a label switching system does with respect to establishing connections over different link types. In this way, connections may be established over various link types independent of the connection controller's type. VSI therefore allows separate independent control of a switch by controllers 520–526. By way of VSI one may set up switch connections and virtual channels, or circuits, or labels so that software for network layers and layers above the network layer may be written independently of any particular switch.

Connection controllers 520, 522 524 and 526 may request LSS 506 to create, delete and change connections. LSS 506 may accept or reject the request based on resources availability. LSS responds to the controller with a message indicating the outcome. The messages exchanged between the controllers 520–526 and LSS 506 have a format that provides for control of the LSS 506 with a mixture of interface types.

The connection controllers shown in the figure are VSI controllers. A VSI controller is a connection controller that controls a switch via a VSI. In dealing with the communications between a VSI controller and the switch, the switch makes particular switch connections when requested by the VSI controller. At the data link layer, the switch cross-connects labels and links to other labels and other links is directed by the controller through the VSI. At the network link layer the connection routing protocol, that runs in software on the switch, sets up connections across the network according to programming or demands from users.

A VSI typically includes two software components: a VSI-slave running on the switch; and a VSI-master which may run on the switch or on a dedicated controller platform.

The VSI-slave is a slave unit that manages some of the interfaces for the switch and communicates with other slaves in the switch to set up connections. For one embodiment, the VSI slave may interface with any link type by way of MPLS encapsulation. The VSI-master interfaces to the higher layer networking software and handles all VSI related functions.

The functions performed by VSI controllers include general controller functions and VSI-related controller functions. The VSI controller communicates with other controllers on other switches to learn and distribute network topology and loading. For example, a PNNI controller on one switch may communicate with the PNNI controllers on neighboring switches to establish connections. The controller performs end-to-end route selection for calls, including general call acceptance. The controller also communicates with other controllers on different switches to perform call setup. Furthermore, the controller performs local call setup signaling protocols including switched permanent virtual circuit management.

In addition to general controller functions, each controller performs VSI-related controller functions (VSI master). The controller requests local connection segment setup, activate, and teardown from switches. The controller manages VPI/VCIs data link connection identifier labels, or MPLS labels for example. Moreover, the controller manages a subset of these resources as allocated to it by the VSI slave. The controller records the resources it allocates on each link so that it may use this information when routing connections. The controller may also perform keep-alive polling of each corresponding slave.

The functions performed by a VSI switch include general switch functions and VSI-related switch functions (VSI-slave). As to the VSI-related switch functions, the switch responds to connection segment requests from controllers. As to general switch functions, the switch manages channel allocation, bandwidth, and configuration of interfaces. The switch manages the administrative, operational state of port and trunk interfaces.

Figure 6:
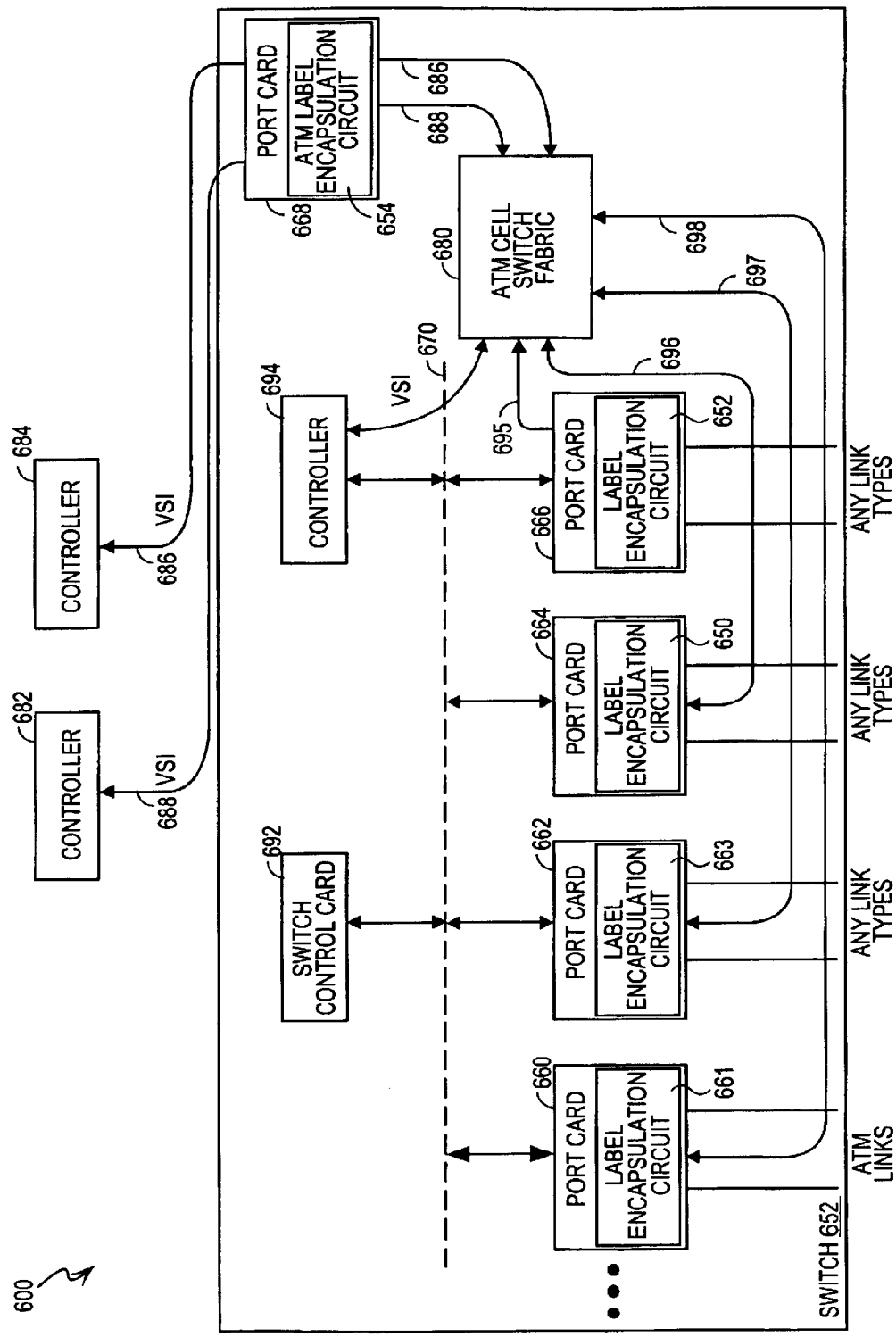
FIG. 6 is a block diagram illustrating an embodiment of a multiport switch in communication with several connection routing controllers according to one embodiment of the present invention.

FIG. 6 is a block diagram illustrating a multiport network switch 652 (switch) and connection controllers 682, 684, 694. Switch 652 is configured to communicate with the controllers via connection control interfaces 686, 688, and 670 that may be VSIs for one embodiment. Switch 652 includes control card 692 and a plurality of port cards 660, 662, 664 and 666, 668. A VSI slave exists on each port card 660–666 of switch 652. Inter-slave messaging is transported through a mesh of switch connections (not shown). Switch connections also connect each of the VSI controllers 682, 684, and 694 to each slave of each port card 660–666. VSI controllers 682, 684 communicate with switch 652 via data links through port card 668. VSI controller 694 is internal to switch 652 and communicates with the rest of switch 652 by way of an internal link. The data links comprise virtual channels 688 and 686 that carry VSI messages from VSI controllers 682 and 684 to a cell switch fabric 680 that may be an ATM switch fabric. Switch fabric 680 is coupled to each of the port cards 660–666 via switch legs 695–698 that carry VSI messages to port cards 660–666.

The switch performs label encapsulation by way of label encapsulation circuits, such as circuits 661, 663, 650, 652, and 654, located on each port card. For one embodiment the label encapsulation circuits perform MPLS encapsulation on some port cards. The MPLS encapsulation supports any link types, including ATM links, Ethernet links, frame relay links, point-to-point protocol (PPP) over synchronous optical network (SONET) links, wavelength division multiplexing links, etc. The MPLS encapsulation may be slightly different for each link as it operates over media access control (MAC) or similar data link layer control software which is specific to each link type. For support of links such as ATM links, which inherently support virtual channels, a different form of label encapsulation may be used. For example, ATM VPI/VCI encapsulation is a form of label encapsulation that applies to ATM links.

Switch 652 has both hardware and software architectures. The hardware architecture includes a switch core and port cards. For the embodiment illustrated in FIG. 6, the switch core performs switching of ATM cells. Most functions that handle ATM cell switching are performed in the port cards. These functions include VPI/VCI assignment, and discarding cells when needed. The port cards adapt between the ATM VPI/VCI switching and the switch core of the label encapsulation used on the data links.

Figure 7:
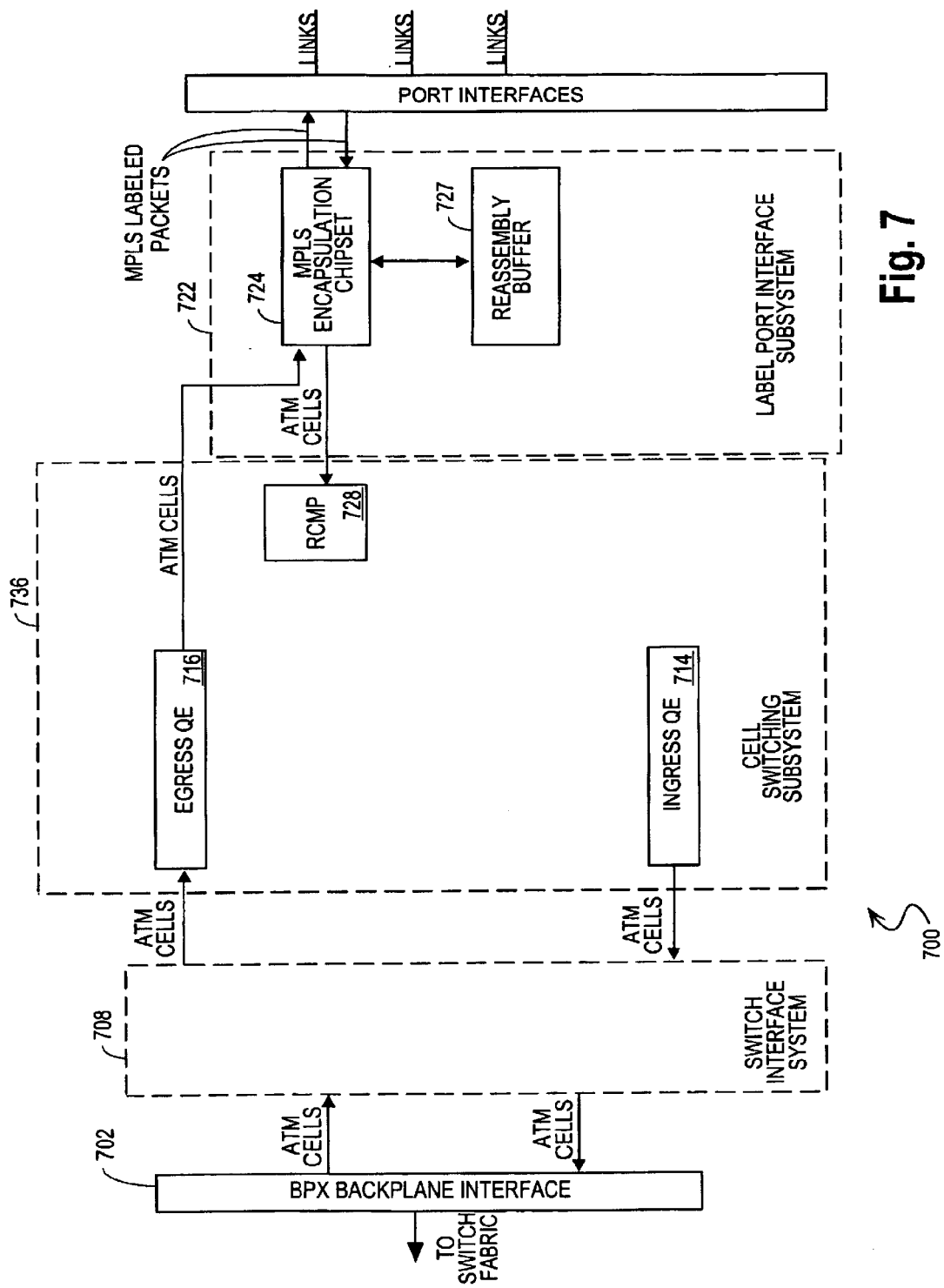
FIG. 7 is a block diagram illustrating a multiport card according to one embodiment of the present invention.

FIG. 7 is a block diagram of a port card 700 implementing one embodiment of the present invention. For one embodiment, card 700 is a BXM™ card of a BPX™8650 switch made by Cisco Systems, Inc., of San Jose, Calif. Card 700 includes a BPX backplane interface 702 that is coupled to a cell switch fabric (not shown) and to a switch interface subsystem 708. The switch interface subsystem 708 interfaces between a switch fabric (not shown) and a port card by way of BPX backplane interface 702.

Switch interface subsystem 708 is coupled to a cell switching subsystem 736. The cell switching subsystem 736 includes an ingress Queuing Engine (QE) 714, an egress QE 716, and a Resource Control Monitoring and Policing (RCMP) unit 728. The RCMP 728 performs functions including VC identification for arriving cells and policing connection i.e., identifies VPI/VCI of incoming cells, and enforces traffic controls for incoming cells. A QE (1) maintains all queues on the card; (2) performs associated cell memory buffers DRAM refresh activity; (3) implements a service algorithm for virtual circuits class of service queues and virtual interfaces; (4) maintains connection statistics and queue thresholds; (5) performs explicit rate stamping for ABR connections; and (6) performs Segmentation and Reassembly (SAR) processing.

Furthermore card 700 includes a Label port interface subsystem 722. Subsystem 722 includes a label interface 724 and a reassembly buffer 727. Reassembly buffer 727 stores cells during reassembly into packets. In one embodiment, label interface 724 includes an MPLS Encapsulation Chipset. The MPLS Encapsulation Chipset 724 may adapt the ATM cell switching used internally in the switch to support label encapsulation (MPLS encapsulation) and any link types. The MPLS Encapsulation Chipset 724 adapts between ATM cells, as used internally in the switch, and MPLS labeled packets. This is done by way of a process outlined in the flow chart shown in FIG. 8 and described below.

Figure 8:
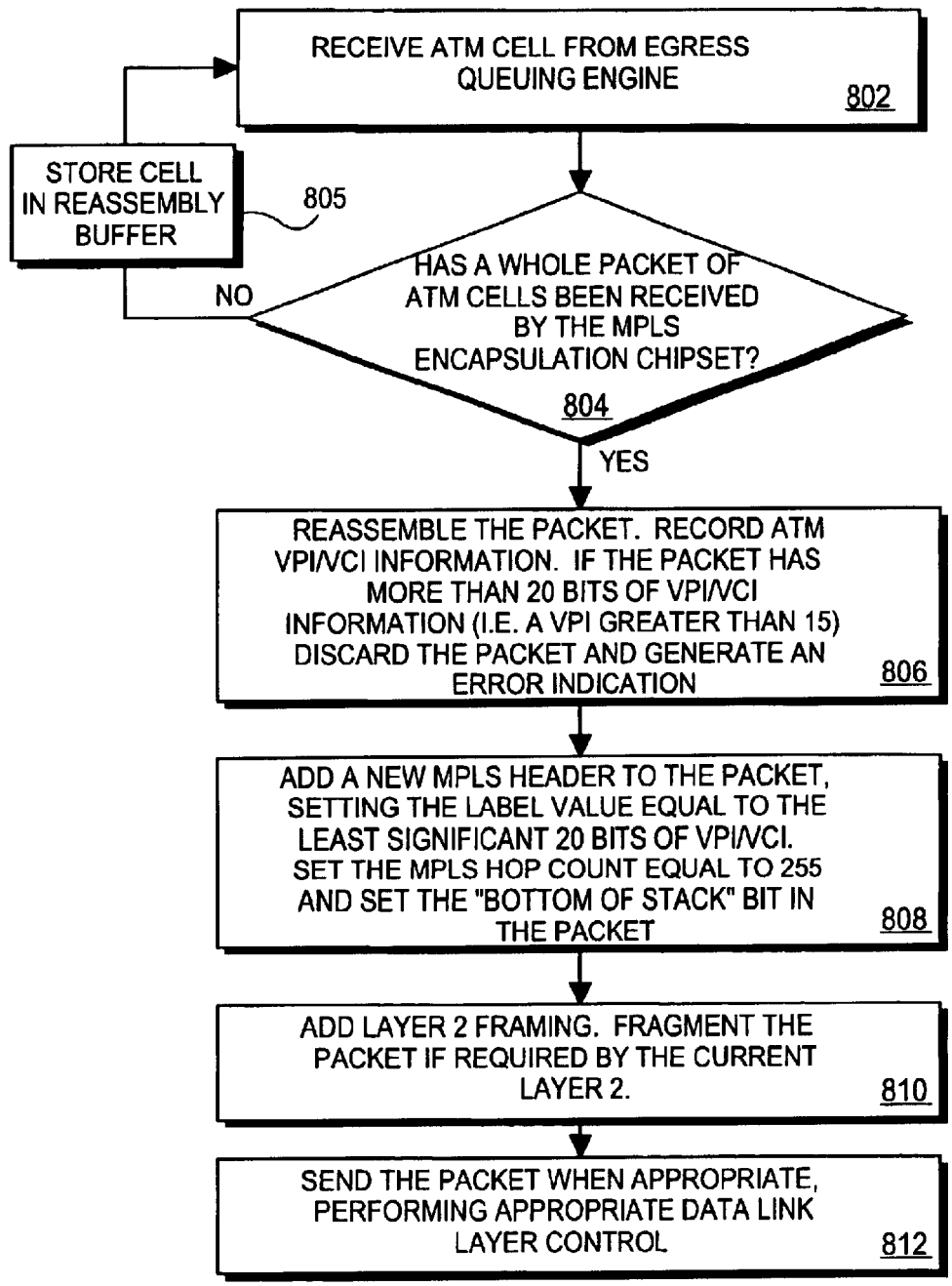
FIG. 8 illustrates a flow chart in connection with a process performed by a label encapsulation system before a packet is sent to a link.

FIG. 8 is a flow chart that illustrates a process performed by a label encapsulation unit, such as the MPLS encapsulation chipset, when outgoing data to be transmitted to a link is received by the MPLS encapsulation unit. This process may be performed by a label encapsulation unit such as a label (MPLS) Encapsulation Chipset. Briefly, according to this process, (1) it is determined whether all cells of a packet have been received; (2) the packet is reassembled and VPI/VCI information is recorded if all cells of the packet have been received; and (3) an MPLS header is added to the packet's and layer 2 framing is added to the packet.

The process starts at step 802 where an ATM cell is received from an egress QE. Next, the process flows to decision block 804 where it is determined whether a whole packet of ATM cells has been received by the MPLS encapsulation chipset. If a whole packet has not been received by the MPLS Encapsulation Chipset, the cell received is stored, at block 805, in a reassembly buffer. Then the process goes back to block 802 where the MPLS encapsulation chipset receives a new ATM cell from the egress QE. If a whole packet has been received by the MPLS encapsulation chipset, the process flows to block 806 where the packet is reassembled and VPI/VCI information is recorded. For one embodiment, if the packet has more than 20 bits of VPI/VCI information i.e., a VPI is greater than 15, the packet is discarded and an error indication is generated. The packet is discarded because MPLS encapsulation may support no more than 20 bits of label.

Next, the process flows to block 808 where a new label (MPLS header) is added to the packet. The label value is set equal to the least significant 20 bits of VPI/VCI. The MPLS hop count is set to a predetermined value to prevent the label switching system from discarding the packet. For one embodiment, the MPLS hop count may be set to a value greater than one. For example, the MPLS hop count may be set to a value equal to 255. Then the "bottom of stack" bit in the packet is set. Next, at block 810 layer 2 framing is added. The packet is fragmented if required by the current layer 2. The packet is then sent when appropriate at block 812 and appropriate data link layer control is performed. The above-described process is generic for any link such as PPP-over-SONET, Ethernet, etc. Typically the packet is sent at block 812 though the chipset may have to deal with link-layer retransmits, frame stuffing, or other procedures specific to link layers.

Figure 9:
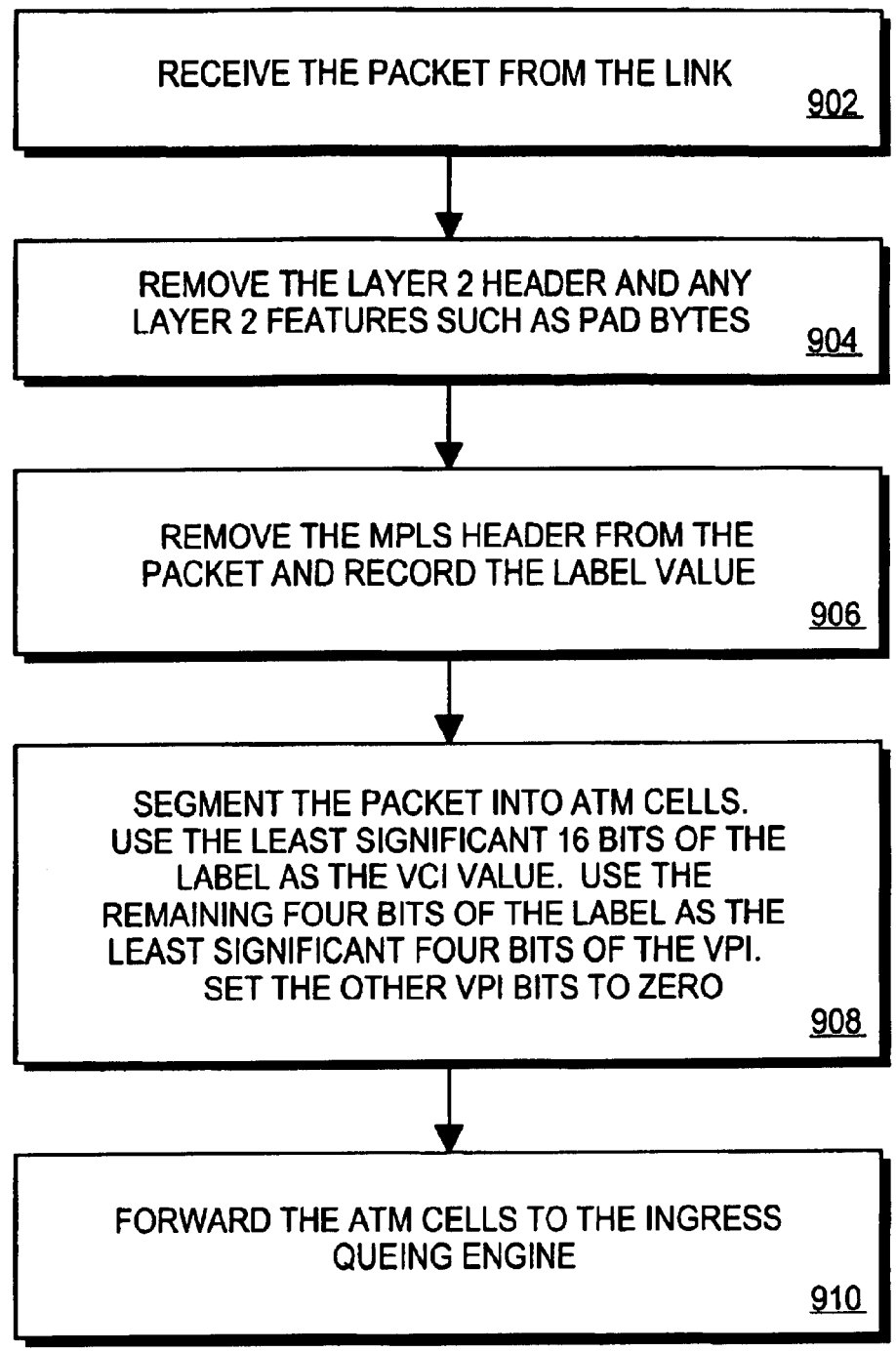
FIG. 9 is a flow chart that illustrates a process performed by the label encapsulation chipset when a packet is received from a link.

FIG. 9 is a flow chart that illustrates a process performed by a label encapsulation unit, such as the MPLS encapsulation chipset, when an incoming packet is received from a link. Briefly, (1) layer 2 header and layer 2 features are removed form the incoming packet; (2) an MPLS header is removed from the incoming packet; and (3) the MPLS header is decoded to determine VPI and VCI.

The incoming packet is received from a link at block 902. The process flows to block 904 where a layer 2 header and any layer 2 features such as pad bytes are removed. Next at block 906 the MPLS header is removed from the packet and the label value is recorded. At block 908 the packet is segmented into ATM cells. The least significant 16 bits of the label are used as the VCI value. The remaining 4 bits of the label are used as the least significant bits of the VPI. The other VPI bits are set to zero. Next at block 910, the ATM cells are forwarded to the ingress QE. In an alternative embodiment of the processes explained in connection with FIGS. 8 and 9, packets that are too large for media access control (MAC) layer to handle are fragmented and marked with an extra header at the sending end.

In the foregoing specification, the invention has been described with reference to exemplary embodiments thereof. It will, however, be evident that various modifications and changes may be made thereto without departing from the broader spirit and scope of the invention as set forth in the appended claims. The specification and drawings are accordingly, to be regarded in an illustrative rather than a restrictive sense.

What is claimed is:

1. A method, comprising:
  receiving, at a first port, a packet that is labeled with an MPLS label;
  breaking said packet down into a plurality of ATM cells, each of said plurality of ATM cells to transport a different piece of said packet, each of said ATM cells having VPI/VCI information, said VCI information having a least significant 16 bits of said MPLS label, said VPI information having a next four bits of said MPLS label beyond said least significant 16 bits;

switching said plurality of cells through an ATM switching fabric toward a second port, said plurality of cells having new VPI/VCI information as a consequence of said switching, said first and second ports coupled to said ATM switching fabric within a networking system; and, if said new VPI information does not have a value greater than 15: sending, from said second port, said packet labeled with a new MPLS label, said packet being reassembled by combining pieces of said packet that are transported by said ATM cells, said new MPLS label having a least significant 20 bits of said new VPI/VCI information, if said new VPI information has a value greater than 15: generating an error indication.

2. The method of claim 1 further comprising setting each remaining bit of said VPI information equal to 0.

3. The method of claim 1 wherein said packet that is labeled with an MPLS label further comprises a layer 2 header.

4. The method of claim 3 further comprising removing said layer 2 header prior to said breaking said packet down into a plurality of ATM cells.

5. The method of claim 1 further comprising discarding said packet if said new VPI information has a value greater than 15.

6. The method of claim 1 further comprising setting a hop count in said new MPLS label equal to 255 prior to said sending.

7. The method of claim 1 further comprising adding layer 2 framing to said packet prior to said sending.

8. The method of claim 1 wherein said receiving further comprises receiving said packet from an Ethernet link.

9. The method of claim 1 wherein said receiving further comprises receiving said packet from a Frame Relay link.

10. The method of claim 1 wherein said receiving further comprises receiving said packet from a point-to-point (PPP) over SONET link.

11. The method of claim 1, wherein said receiving further comprises receiving said packet from a wavelength division multiplexing link.

12. An apparatus, comprising:

a first port to receive a packet that is labeled with an MPLS label, said first port further comprising a first functional unit to break down said packet into a plurality of ATM cells, each of said plurality of ATM cells to transport a different piece of said packet, each of said ATM cells having VPI/VCI information, said VCI information having a least significant 16 bits of said MPLS label, said VPI information having a next four bits of said MPLS label beyond said least significant 16 bits;

an ATM switching fabric coupled to said first port, said ATM switching fabric to switch said ATM cells, said plurality of cells to have new VPI/VCI information as a consequence of their being switched; and, a second port coupled to said ATM switching fabric, said second port to:

if said new VPI information does not have a value greater than 15: receive said ATM cells after their said being switched, said second port to send said packet labeled with a new MPLS label, said second port further comprising a second functional unit that reassembles said packet by combining pieces of said packet that are transported by said ATM cells, said new MPLS label having a least significant 20 bits of said new VPI/VCI information;

if said new VPI information has a value greater than 15: generate an error indication.

13. The apparatus of claim 12 wherein said first port sets each remaining bit of said VPI information equal to 0.

14. The apparatus of claim 12 wherein said packet that is labeled with an MPLS label further comprises a layer 2 header.

15. The apparatus of claim 14 wherein said first port removes said layer 2 header prior to said packet with an MPLS label being said broken down into a plurality of ATM cells.

16. The apparatus of claim 12 wherein said second port discards said packet if said new VPI information has a value greater than 15.

17. The apparatus of claim 12 wherein said second port sets a hop count in said new MPLS label equal to 255 prior to said packet with a new MPLS label being said sent.

18. The apparatus of claim 12 wherein said second port adds layer 2 framing to said packet with a new MPLS label prior to said packet being said sent.

19. The apparatus of claim 12 wherein said first port communicates over an Ethernet link.

20. The apparatus of claim 12 wherein said first port communicates over a Frame Relay link.

21. The apparatus of claim 12 wherein said first port communicates over a point-to-point (PPP) over SONET link.

22. The apparatus of claim 12 wherein said first port communicates over a wavelength division multiplexed link.

23. The apparatus of claim 12 further comprising a connection routing and signaling controller coupled to said ATM switching fabric.

24. The apparatus of claim 23 wherein said connection routing and signaling controller further comprises a PNNI connection routing and signaling controller.

25. The apparatus of claim 23 wherein said connection routing and signaling controller further comprises an AutoRoute™ connection routing and signaling controller.

26. The apparatus of claim 12 wherein said first functional unit is a label port interface subsystem comprising a label interface coupled to a reassembly buffer.

27. The apparatus of claim 26 wherein said label interface further comprises an MPLS encapsulation chipset.

28. The apparatus of claim 26 wherein said first port further comprises an ingress queue engine to queue said ATM cells having said VPI/VCI information.

29. The apparatus of claim 26 wherein said first port further comprises an Resource Control Monitoring and Policing unit to identify said VPI/VCI information and to enforce traffic controls.

30. The apparatus of claim 26 wherein said label port interface subsystem is coupled to a port interface that supports communication over a Frame Relay link.

31. The apparatus of claim 26 wherein said label port interface subsystem is coupled to a port interface that supports communication over a point-to-point (PPP) over SONET link.

32. The apparatus of claim 26 wherein said label port interface subsystem is coupled to a port interface that supports communication over a wavelength division multiplexing link.

33. The apparatus of claim 26 wherein said label port interface subsystem is coupled to a port interface that supports communication over an Ethernet link.

34. An apparatus, comprising:
means for receiving a packet that is labeled with an MPLS label;
means for breaking said packet down into a plurality of ATM cells, each of said plurality of ATM cells to transport a different piece of said packet, each of said ATM cells having VPI/VCI information, said VCI information having a least significant 16 bits of said MPLS label, said VPI information having a next four bits of said MPLS label beyond said least significant 16 bits;
means for switching said plurality of cells, said plurality of ATM cells having new VPI/VCI information as a consequence of said switching;
means for sending said packet labeled with a new MPLS label if said new VPI information does not have a value greater than 15, said packet being reassembled by combining pieces of said packet that are transported by said ATM cells, said new MPLS label having a least significant 20 bits of said new VPI/VCI information; and,
means for generating an error indication if said new VPI information has a value greater than 15.

35. The apparatus of claim 34 further comprising means for setting each remaining bit of said VPI information equal to 0.

36. The apparatus of claim 34 further comprising means for discarding said packet if said new VPI information has a value greater than 15.

37. The apparatus of claim 34 further comprising means for setting a hop count in said new MPLS label equal to 255 prior to said sending.

38. An apparatus, comprising:
a first port to receive a packet that is labeled with an MPLS label, said first port further comprising a first circuit to break down said packet into a plurality of ATM cells, each of said plurality of ATM cells to transport a different piece of said packet, each of said ATM cells having VPI/VCI information, said VCI information having a least significant 16 bits of said MPLS label, said VPI information having a next four bits of said MPLS label beyond said least significant 16 bits;
an ATM switching fabric coupled to said first port, said ATM switching fabric to switch said ATM cells, said plurality of cells to have new VPI/VCI information as a consequence of their being switched; and,
a second port coupled to said ATM switching fabric,
said second port to, if said new VPI information does not have a value greater than 15, receive said ATM cells after their said being switched and send said packet labeled with a new MPLS label, said second port further comprising a second circuit to reassemble said packet by combining pieces of said packet that are transported by said ATM cells, said second circuit also comprising circuitry to determine said new MPLS label, said new MPLS label having a least significant 20 bits of said new VPI/VCI information;
said second circuitry also comprising circuitry to generate an error indication if said new VPI information has a value greater than 15.

39. The apparatus of claim 38 wherein said first circuitry is also designed to set each remaining bit of said VPI information equal to 0.

40. The apparatus of claim 38 wherein said packet that is labeled with an MPLS label further comprises a layer 2 header.

41. The apparatus of claim 40 wherein said first port is also designed to remove said layer 2 header prior to said packet with an MPLS label being said broken down into a plurality of ATM cells.

42. The apparatus of claim 38 wherein said second circuitry also comprises circuitry to discard said packet if said new VPI information has a value greater than 15.

43. The apparatus of claim 38 wherein said second circuitry also comprises circuitry to set a hop count in said new MPLS label equal to 255 prior to said packet with a new MPLS label being said sent.

44. The apparatus of claim 38 wherein said second port adds layer 2 framing to said packet with a new MPLS label prior to said packet being said sent.

45. The apparatus of claim 38 wherein said first port is designed to communicate over an Ethernet link.

46. The apparatus of claim 38 wherein said first port is designed to communicate over a Frame Relay link.

47. The apparatus of claim 38 wherein said first port is designed to communicate over a point-to-point (PPP) over SONET link.

48. The apparatus of claim 38 wherein said first port is designed to communicate over a wavelength division multiplexed link.

49. The apparatus of claim 38 further comprising a connection routing and signaling controller coupled to said ATM switching fabric.

50. The apparatus of claim 49 wherein said connection routing and signaling controller further comprises a PNNI connection routing and signaling controller.

51. The apparatus of claim 49 wherein said connection routing and signaling controller further comprises an AutoRoute™ connection routing and signaling controller.

52. The apparatus of claim 38 wherein said first port further comprises an ingress queue engine to queue said ATM cells having said VPI/VCI information.

53. The apparatus of claim 38 wherein said first port further comprises a Resource Control Monitoring and Policing unit to identify said VPI/VCI information and to enforce traffic controls.

* * * * *